June 10, 1952     J. J. BOYD ET AL     2,599,539
VIBRATION MEASURING DEVICE

Filed May 9, 1946     2 SHEETS—SHEET 1

Inventor
Flood Everett Reed
Joseph James Boyd

Attorney:

June 10, 1952    J. J. BOYD ET AL    2,599,539
VIBRATION MEASURING DEVICE
Filed May 9, 1946    2 SHEETS—SHEET 2
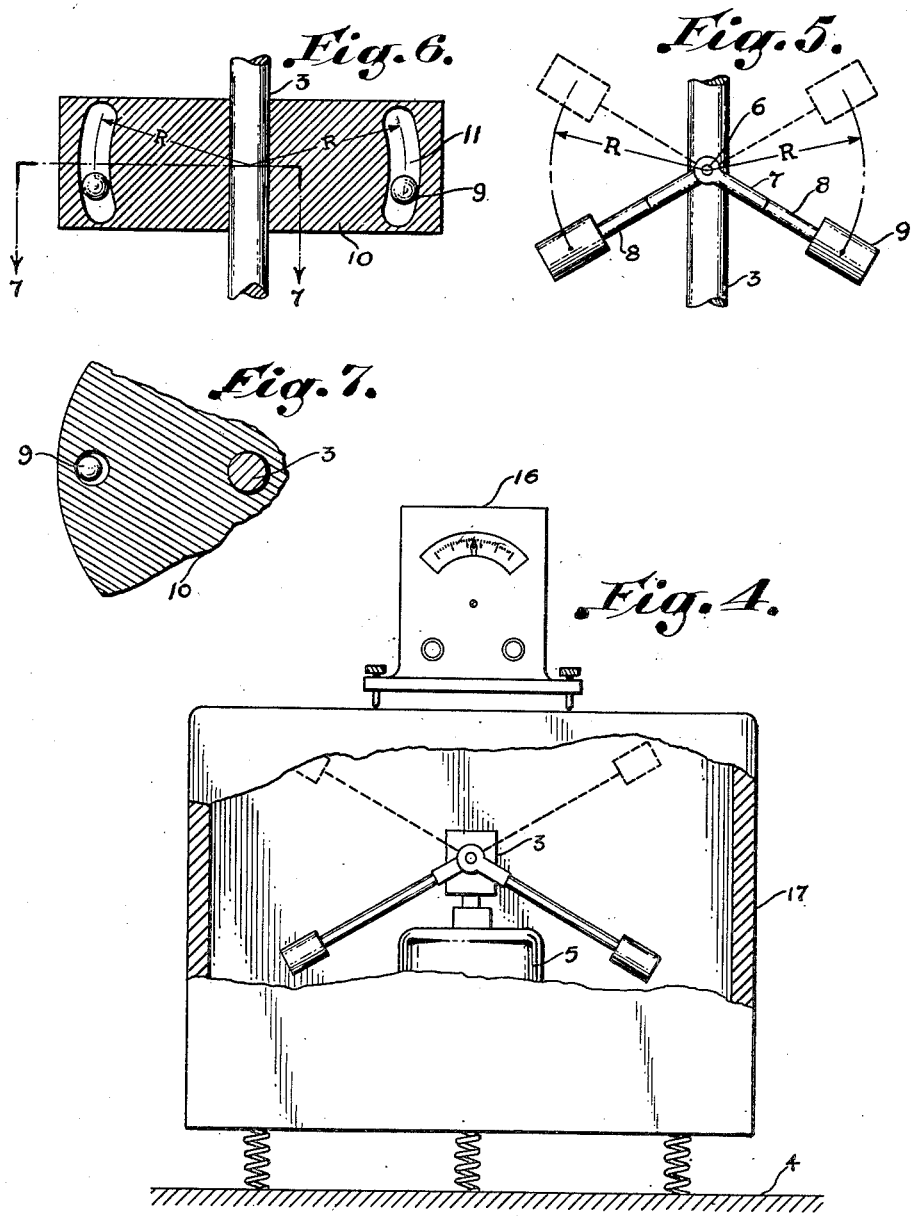
Inventor:
Flood Everett Reed
Joseph James Boyd
Sol B. Wright
Attorney:

Patented June 10, 1952

2,599,539

UNITED STATES PATENT OFFICE 2,599,539

VIBRATION MEASURING DEVICE

Joseph J. Boyd, Washington, D. C., and Flood Everett Reed, Middlesex County, Mass.

Application May 9, 1946, Serial No. 668,399

7 Claims. (Cl. 73—71)

(Granted under the act of March 3, 1883, as amended April 30, 1928; 370 O. G. 757)

The invention described herein, if patented, may be manufactured and used by or for the Government of the United States for governmental purposes without the payment of any royalty thereon or therefor.

The present invention relates to devices for damping linear as distinguished from torsional, flexional or transverse periodic vibrations and more specially those existing in ships, motor vehicles, and airplanes due to the working of the engines, propellers, or other rotating machinery capable of producing linear periodic vibrations.

An object of the present invention is to provide a device which will force a node at the point of application on a vibrating supporting structure in such manner as to practically neutralize the linear component of a vibration.

A further object is to provide a pendulum type vibration damper which lends itself to each of manufacture and adjustment, and maintains its natural frequency irrespective of wear in the bearings or changes in tolerance.

It is a further object to provide a pendulum type of vibration damper wherein the pendulum is pivoted on the axis of a shaft rotating at the frequency of vibration to be damped and requires no tuning in order to dampen vibrations along the axis of the shaft.

It is a further object to construct a vibration damper to support a testing instrument or a similar sensitive device on a vibrating surface to obtain accurate readings or operations independently of linear vibrations which would otherwise affect the instrument.

It is a further object to provide a vibratory force measuring instrument.

It is a further object to provide an instrument capable of measuring the amplitude or accelerations of a vibrating structure.

Other objects will be inherent in the disclosure or will be apparent to one skilled in the art.

An essential feature of the present invention consists in providing a moveable mass, adapted to rotate together with a rotating shaft, the mass being connected to the shaft so as to be able to oscillate with a pendular motion in a plane containing the axis if the shaft, through an arc whose center is on the axis of the shaft, said mass being acted on by a centrifugal force resulting from the rotation of the shaft, whereby when the point at which said mass and said shaft are connected together undergoes vibrations the frequency of which equals the frequency of revolution having at least one component parallel to said shaft, the pendulum thus formed oscillates in such a manner that it forces a node at the point of pendulum suspension and thereby neutralizes or reduces the vibration.

In the tuned damper disclosed herein the pendular mass oscillates about a point on the axis of rotation as distinguished from dampers of previous design, the pendular masses of which oscillate about points remote from the axis of rotation. In the present invention the center of the arc of oscillation of the pendular mass is located on the axis of rotation in such a way that the pendular mass moves in a plane containing the axis of rotation. The frequency of oscillation of the pendulum so formed equals the frequency of revolution of the shaft irrespective of the length of the pendulum or the weight of the pendular mass. An axial force resulting from a linear vibration of a frequency equal to the frequency of revolution applied to this damper, causes the pendular masses to oscillate in resonance, and approximately 180° out of phase with the applied vibrational force and with such amplitude that the vibrational force is substantially neutralized and thereby forces a node on the damper support at the point of application.

The amplitude of oscillation of the pendular mass is proportional to the disturbing vibrational force at the point of suspension of the pendulum. When this point of suspension of the pendulum is axially fixed to vibrate with the vibrating structure the amplitude of swing or oscillation of the pendular mass is directly proportional to and therefore a measure of the vibrating force acting at the point of suspension. However, when the rotating axis to which the pendular mass is pivoted is flexibly attached to the vibrating structure, the amplitude of swing or oscillation of the pendular mass is proportional to the amplitude or acceleration of vibration of the vibrating structure. Hence it is apparent by directly measuring the arc of swing of the pendular mass, either the vibrational force, where the rotating axis is rigidly coupled to axially vibrate with the vibrating structure, or the amplitude or acceleration of the vibration where the rotating axis is flexibly coupled with the vibrating structure, is measured. Where a flexible coupling is used a greater degree of flexibility will favor measurement of amplitude whereas a lesser degree of flexibility will favor measurement of acceleration.

Moreover it will be apparent that any flexible support for the damper will transfer vibrations thereto only within the limits of flexibility thereof, and therefore will transfer only a portion of the vibrational force applied thereto within such limits. Conversely, the damper so coupled will damp only the vibrations acting thereon hence the flexible support enables this vibration damper to damp only the fraction of the total vibrational force actually transferred thereto. This allows a damper of any size to be used to dampen a proportional fraction of the vibrational force transferred within the limits of flexibility of the support.

Finally it will be apparent that inasmuch as a node is formed on a rotating, relatively inflexible shaft at the point of pendular suspension, no vibration beyond the limit of shaft flexibility takes place on other points of the shaft remote therefrom. Hence the vibration damped shaft and structures rigidly fixed thereto form a desirable non-vibrating support for delicate measuring instruments or other sensitive devices to be used in a vibrating system. These and other features of the invention will be best understood by reference to the drawings wherein Figure 1 is an elevation of a form of damper having several pendulums.

Figure 4 is an elevation of an assembly with parts broken away to show a flexibly mounted vibration damper in damped support for a delicate measuring instrument.

Figure 5 is a detail showing a type of attachment of pendulums to a shaft so that the pendulums will swing in an arc whose center is on the shaft.

Figure 6 is a detail of a modified form of pendulum wherein the pendular mass comprises balls confined to movement in arcs the center of which lie on the axis of rotation.

Figure 7 is a sectional detail in plan taken on the line 7—7 of Figure 6.

Figure 1:
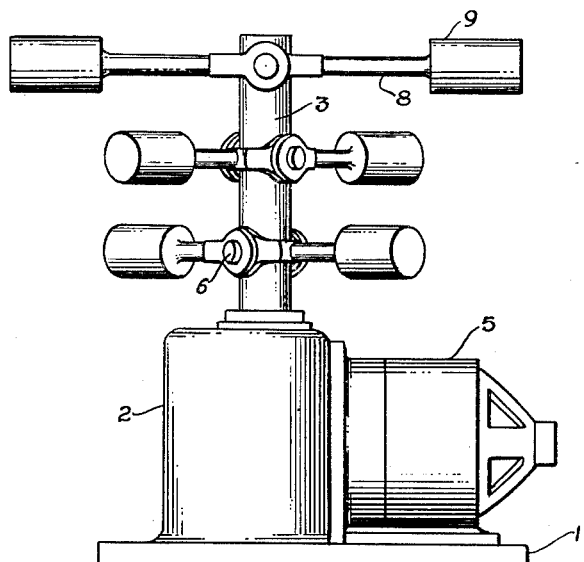

Referring to the drawings Figures 1 and 5, the damper is constructed of a base 1 on which is mounted a housing 2 in which is journaled for rotation a shaft 3, and rigidly attached thereto in an axial direction. The axis of said shaft is disposed perpendicular to the vibrating structure 4, so that the vertical component of the linear periodic vibrations within the vibrating structure will be damped. While the drawings show the shaft 3, mounted vertically to the vibrating structure 4 it will be apparent that the linear vibration component in any direction may be damped by mounting the shaft with the axis disposed parallel to the direction of the particular liner vibration to be damped. The shaft is directly (as in Figs. 2, 3 and 4) or thru suitable gearing (not shown) rotated at a variable speed such as by a variable speed motor 5, so that a rate of rotation equal to the period of vibration may be used and the shaft 3 rotated at such speed. Pivotally mounted thru the axis of the shaft 3 by pins 6, yokes 7 and radial connecting arms 8, are a series of pendular masses 9 preferably coupled in pairs, using one or more pairs as desired. The pendular masses 9 thru pivot pins 6 when rotated radially with the shaft 3 swing outwardly with the centrifugal force developed by rotation thereof and lie in a plane always containing the center of the shaft but are free to oscillate in arcs, the center of which lies on and coincides with the axis of the shaft 3.

The pendular masses 9 may be radially supported from the shaft 3 in other suitable or conventional ways than with rigid rods, such for example as rubber arms, flexible cable, or even chain without in any way affecting the pendulum frequency. Such dependent type supports may be omitted and guideways or slots 11 cut in a confining body 10, radially disposed from the axis and mounted to rotate with shaft 3 may be substituted as shown in Figs. 6 and 7. The guideways 11 are radially disposed from the axis and are symmetrical with respect to a plane perpendicular to the axis. In such case the masses 9 oscillate by sliding or rolling about a point on the axis of the shaft 3 which is the center of the arc of curvature of the confining guideways or slots 11 wherein the pendular masses 9 are disposed. Since each pendular mass 9 is confined to move arcuately about a point on the axis of rotation, any periodic force or component thereof acting along the axis of rotation and having a frequency equal to the frequency of rotation of shaft 3 causes the pendulums to swing in resonance to the input force with an amplitude and phase angle such that the vibratory force is substantially neutralized.

Where the pendulum arms 8 are composed of links of chain or other flexible material, the fundamental frequency of the pendulum is always the frequency of revolution provided the pendulum is pivoted on the axis of rotation. Since each link oscillates about the same point on the axis of rotation, all links have the same frequency irrespective of their distance out from the center of rotation and therefore the whole chain acts as a unit to neutralize any vibratory force or component thereof acting along the axis of rotation. While we have shown a motor 5 to control the speed of rotation of the shaft 3, it will be apparent that this shaft may be coupled to the motor or other rotating device which is actually producing the vibrations.

Figure 2:
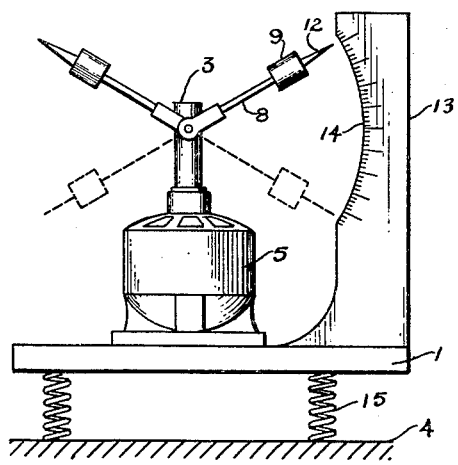
Figure 2 is an elevation of a pendulum damper flexibly mounted with an indicator to measure amplitude or acceleration of a vibrating structure.

The vibration damper as noted above has certain special applications. By attaching a pointer 12 to the end of the pendulum and mounting a scale 13 on the base 1 suitably calibrated at 14 close to the end of the pendulum, the length of the arc of oscillation may be measured directly or thru a stroboscope or any other electrical or mechanical reading instrument (not shown). As shown in Fig. 2, the damper is flexibly mounted to the vibrating structure 4 by springs 15. Only that portion of the vibrational energy within the limits of flexiblity of the springs is transferred to and damped by the damper. However, in any case the length of arc of the pendulum swing will be proportional to and a measure of both the amplitude and acceleration of the vibration. As noted above where amplitude is the desired measurement relatively flexible springs will be used, while more rigid springs will be used to indicate the acceleration of the vibration.

Figure 3:
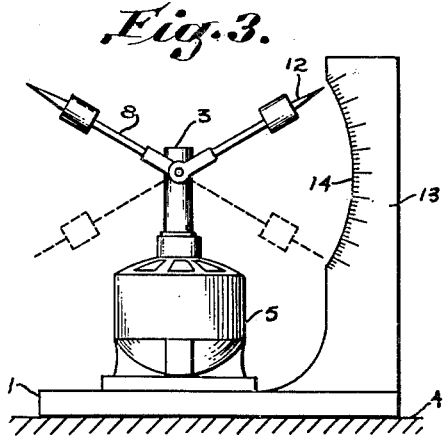
Figure 3 is a structure similar to Fig. 2, but rigidly mounted to measure vibrational force.

As shown in Fig. 3, all the force of vibration may be applied to the damper and measured by the arc of oscillation of the pendulums when the damper is rigidly mounted to the vibrating structure 4.

The oscillating pendulums will neutralize the axial vibration in the shaft 3 and bodies rigidly attached thereto. It is therefore possible to support any delicate instrument 16 shown in Fig. 4, in a manner free from vibrations by mounting it on some body 17 rigidly attached to the shaft 3, so as to be vibration free. Since only a portion of the vibrational force is transferred to the damper when it is flexibly mounted, the damper is desirably but not necessarily supported on the vibrating structure 4 thru flexible springs 15 or other flexible mounting. It will be apparent that any device or apparatus other than a delicate instrument 16 may be similarly supported in a vibration free manner.

It will also be apparent that the use of flexible supports for vibration dampers of the present invention may be applied generally since this is a means where, by suitable selection of the flexible support, any portion of the vibrational force may be damped.

The advantages of this invention arise from the fact that the pendular mass in oscillating about the center of rotation eliminates the tuning as required by all other types of pendulum dampers. For any point of the center of oscillation, other than on the axis of rotation of the shaft, the pendulum length, pendulum weight and radius out to the center of oscillation of the pendulum must be carefully chosen for a particular frequency and the tolerances and wear must be kept to minimum if the pendulum is to maintain its frequency; however, if as in the present invention the point of oscillation of the pendulum is placed on the axis of rotation of the shaft, the pendular weight and lengths cease to affect the pendulum frequency which automatically becomes the frequency of rotation of the shaft. The advantages of the present invention are apparent since in the pendulum, close tolerances of lengths and weights, and tuning are eliminated.

It will be apparent that by the present invention a damper is constructed in a greatly simplified manner and certain practical applications result therefrom. Other applications and modifications will be apparent to one skilled in the art within the spirit of the invention and it is intended that the disclosure herein be interpreted as exemplary and not limiting except as defined in the claims.

We claim:

1. A vibration damper for linear periodic vibrations comprising a shaft mounted for rotation about an axis parallel to the linear vibrations to be damped, at least one pendular mass radially fixed to said shaft for rotation therewith, each of said pendular masses being free to oscillate in a plane always containing the axis of said shaft and thru an arc the center of which is on the axis of said shaft and means to rotate said shaft at a speed corresponding to the frequency of the vibration to be damped.

2. A vibration damper for linear periodic vibrations comprising a base rigidly fixed to a vibrating structure for absorbing linear vibrations, a shaft mounted on said base for rotation about an axis parallel to the linear vibrations to be damped, at least one pendular mass radially fixed to said shaft for rotation therewith, each of said pendular masses being free to oscillate in a plane always containing the axis of said shaft and thru an arc the center of which is on the axis of said shaft, and means to rotate said shaft at a speed corresponding to the frequency of the vibration to be damped.

3. A vibration damper for linear periodic vibrations comprising a shaft flexibly mounted in vibration receiving relationship for rotation about an axis parallel to the linear vibrations to be damped, at least one pendular mass radially fixed to said shaft for rotation therewith, each of said pendular masses being free to oscillate in a plane always containing the axis of said shaft and thru an arc the center of which is on the axis of said shaft, and means to rotate said shaft at a speed corresponding to the frequency of the vibration to be damped.

4. A vibration damper for linear periodic vibrations comprising a shaft mounted for rotation about an axis parallel to the linear periodic vibrations to be damped, at least one pair of radially disposed balanced pendular masses pivotally mounted thru the axis of said shaft for rotation therewith whereby each of said pendular masses is free to oscillate in a plane always containing the axis of said shaft and thru an arc the center of which is on the axis of said shaft, and means to rotate said shaft at a speed corresponding to the frequency of the vibration to be damped.

5. A linear periodic vibrational force measuring instrument comprising a base rigidly fixed to a vibrating structure for absorbing linear vibrations therefrom, a shaft mounted on said base for rotation about an axis parallel to the linear vibrations to be damped, at least one pendular mass radially fixed to said shaft for rotation therewith, each of said pendular masses being free to oscillate in a plane always containing the axis of said shaft and thru an arc the center of which is on the axis of said shaft, means for rotating said shaft at a speed corresponding to the frequency of the vibration to be measured and means for measuring the arcuate distance which the pendulums move in each oscillation.

6. A linear periodic vibrational acceleration and amplitude measuring instrument comprising a base flexibly mounted to a vibrating structure to absorb a portion of the linear vibrations therefrom, a shaft mounted on said base for rotation about an axis parallel to the linear vibrations to be damped, at least one pendular mass radially fixed to said shaft for rotation therewith, each of said pendular masses being free to oscillate in a plane always containing the axis of said shaft and thru an arc the center of which is on the axis of said shaft, means for rotating said shaft at a speed corresponding to the frequency of the vibration to be measured and means for measuring the arcuate distance which the pendulums move in each oscillation.

7. A damper for absorbing linear periodic vibrations comprising a shaft mounted in one or more bearings having a common axis parallel with the direction of vibrations to be damped, a plurality of pivot pins mounted on said shaft with their axes intersecting at right angles the axis of said shaft, a plurality of connecting arms each mounted on a pivot pin, a plurality of pendular masses each terminally secured to a connecting arm and means for rotating said shaft at speeds corresponding to the frequency of the linear vibrations to be damped.

JOSEPH J. BOYD.
FLOOD EVERETT REED.

REFERENCES CITED

The following references are of record in the file of this patent:

UNITED STATES PATENTS

| Number | Name | Date |
|---|---|---|
| 2,137,591 | Sarazin | Nov. 22, 1938 |
| 2,191,862 | Sarazin | Feb. 27, 1940 |
| 2,248,653 | Allendorf | July 8, 1941 |
| 2,268,495 | Petty | Dec. 30, 1941 |
| 2,383,588 | Bousky | Aug. 28, 1945 |
| 2,387,223 | Carson | Oct. 16, 1945 |
| 2,406,982 | Zworykin | Sept. 3, 1946 |
| 2,426,305 | Hope | Aug. 26, 1947 |

FOREIGN PATENTS

| Number | Country | Date |
|---|---|---|
| 224,018 | Switzerland | Feb. 1, 1943 |
| 401,962 | France | Nov. 23, 1933 |